Nov. 17, 1925.
W. O. S. GREENER ET AL
1,561,714
NONRETURN VALVE FOR FLUIDS
Filed Dec. 10, 1923
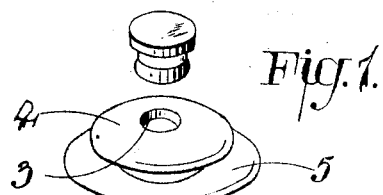
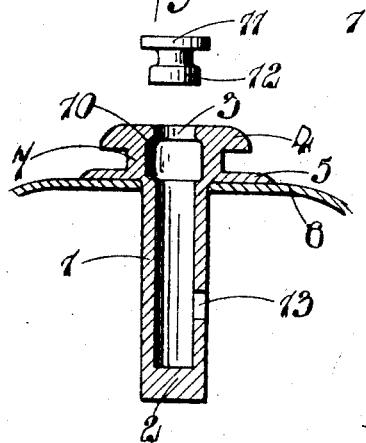
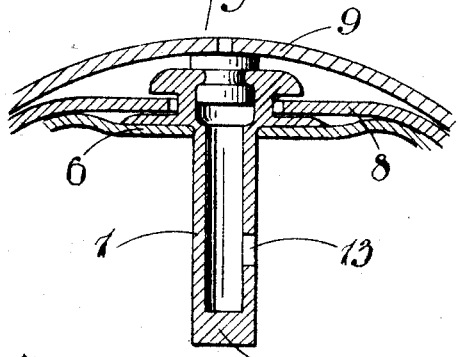
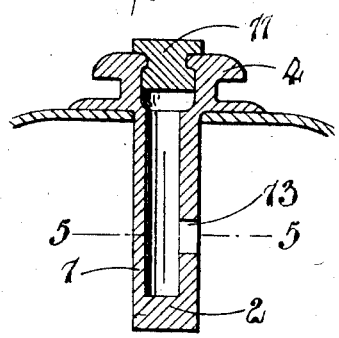

Patented Nov. 17, 1925.

1,561,714

UNITED STATES PATENT OFFICE.

WILLIAM OLIVER SHAKESPEAR GREENER, OF SALCOMBE, SOUTH DEVON, AND JABEZ CLIFF TIBBITS, OF WALSALL, ENGLAND.

NONRETURN VALVE FOR FLUIDS.

Application filed December 10, 1923. Serial No. 679,764.

*To all whom it may concern:*

Be it known that we, WILLIAM OLIVER SHAKESPEAR GREENER and JABEZ CLIFF TIBBITS, subjects of the King of Great Britain, residing at Lower Batson, Salcombe, South Devon, England, and Globe Works, Forster Street, Walsall, in the county of Stafford, England, respectively, have invented new Improvements in Nonreturn Valves for Fluids; and we do hereby declare the following to be a full, clear, and exact description of the same.

This invention relates to valves or devices for automatically preventing the flow of liquids in one direction and is primarily intended for use with inflatable bodies.

More particularly our invention relates to that kind of valve which consists of a rubber tube adapted for insertion into the inflatable body, the outer end of the tube being open and the inner end closed, the tube further being provided with one or more longitudinal slits intermediate its ends, the air or fluid being forced through the slit or slits, the edges of which automatically close to prevent the escape of the fluid as soon as a considerable pressure has been obtained within the inflatable body.

In valves of the kind to which this invention relates in order to avoid the possibility of leakage due to the valve being uncertain in action, it is necessary to construct the valve so that when it is subject to pressure from within the inflatable body it will be certain to collapse in such a manner that the lips of the slit or slits will not be open. Further, it is necessary to construct the valve so as to avoid the possibility of the momentary opening or partial opening of the slit or slits if the inflated body is treated with a certain violence which commonly occurs, for instance, in connection with footballs and punch balls.

The uncertainty of the action of such valves under working conditions has led to various attempts being made by manufacturers to prevent the possibility of the unintentional opening of the slit or slits by providing the tubular valve with one or more additional members such as tubes or straps fitted to the exterior of the valve tube. The present invention has for its primary object to produce an effective and reliable valve consisting of a tube with one or more slits which is free from additional or auxiliary members.

With the object of ensuring that the valve tube when acted upon by pressure within the inflated body will collapse in such manner that the slit or slits are not open, we form or provide at the inner end of the tube a relatively stiff or rigid plug or portion so that when the tube collapses or partially collapses under the pressure within the inflated body, the collapse takes place mainly adjacent the slit so that the lips thereof are forced tightly together.

A further object of our invention is to provide a valve particularly suitable for the inflated bladders of balls of the kind wherein the bladder is separate and removable from an outer case and wherein the outer end of the valve tube is provided with an external flange or enlargement between which and the bladder is a neck of reduced diameter so that the head or enlargement can be placed through or engaged with a hole in a tongue or flap provided on the inner side of the outer case so as to position the valve relatively to the opening in the case, and in accordance with this part of our invention the material at the neck is thicker than the sides of the valve tube.

A further feature of the present invention is to thicken the valve tube along one or more longitudinal lines. We prefer to construct the tube of a cross section represented by the area between two circles which are eccentric to each other. The slit or slits may be placed about midway between the ends of the tube. We prefer to provide a single unit and it may be placed at or near the thick part of the tube if a tube of uneven thickness is used.

Another feature of our invention is to provide a movable plug for the open end of the tube for the purpose of preventing the ingress of dirt or moisture.

Referring to the drawings:—

Figure 1 is a perspective view shewing the valve and the closing plug which has been removed therefrom.

Figure 2 is a view in longitudinal section.

Figure 3 is a view shewing the valve applied to the bladder of a football and shewing how the valve is positioned within the ball.

Figure 4 is a longitudinal section shewing a modification.

Figure 5 is a section on line 5—5 of Figure 4.

In the construction illustrated, the valve consists of a tube 1 having its inner end closed by a relatively stiff or rigid portion 2. This portion 2 may be made integral with the tube 1 or it may be formed as a plug moulded or secured into the end of the tube.

The outer end of the tube 1 has an opening 3 and an external flange 4. A short distance from the open end of the tube is a second external flange 5 by which the valve is secured to the bladder or inflatable body 6.

Between the flanges 4 and 5 is a neck 7 of reduced diameter which is adapted to be engaged by the tongue 8 secured to the outer case 9 of a ball or inflatable body, this engagement serving to locate the valve within the case 9 so as to ensure that the valve will always be directly opposite to the opening in the case through which the nozzle of the inflator is to be inserted. The material of the neck 7 is preferably of greater thickness than the material of the valve tube.

Within the opening 3 is an internal shoulder 10 and for excluding dirt or moisture we may provide a plug 11 having a flange 12, the upper edge of which engages under the shoulder 10.

We prefer to provide a single slit, as shewn at 13, arranged longitudinally and approximately midway along the length of the valve.

In the construction shewn in Figures 4 and 5, the cross section of the tube is formed by the area between two eccentric circles as shewn clearly in Figure 5, the slit 13 being disposed at the thickest part 14 of the tube. With this arrangement, when pressure is generated within the inflatable body, that part of the valve tube which is directly opposite to the slit, being the weakest, collapses against the inner side of the tube at the slit, thus forming a safe closure.

What we claim then is:—

A non-return valve for fluids comprising an elastic tube having one end solid, its middle portion hollow, and its other end open, the walls of the tube being of unequal thickness, said tube having a slit arranged longitudinally in the thick part of the wall of the tube and intermediate its ends.

In witness we affix our signatures.

WILLIAM OLIVER SHAKESPEAR GREENER.
JABEZ CLIFF TIBBITS.